Jan. 17, 1933.   J. C. DAWSON   1,894,736
LOOSE LEAF BINDER BAR
Filed Oct. 6, 1930
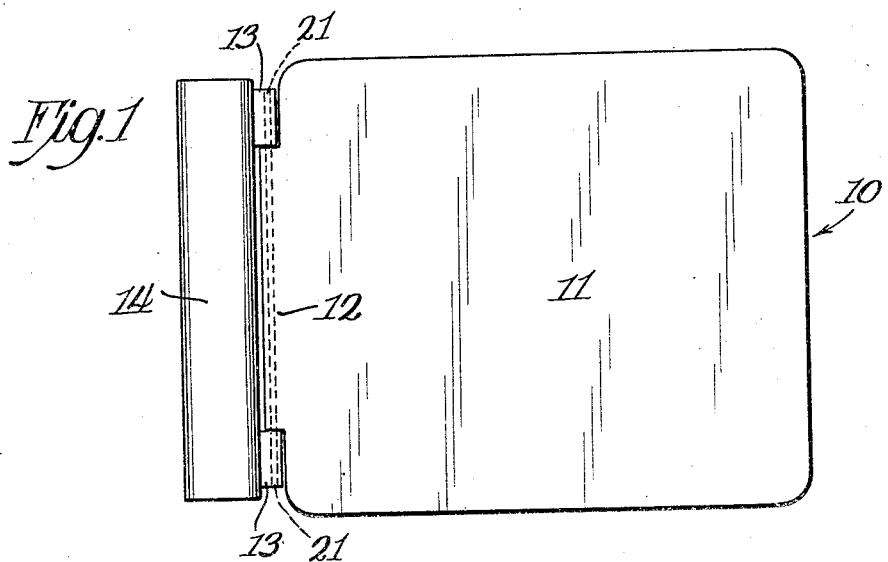
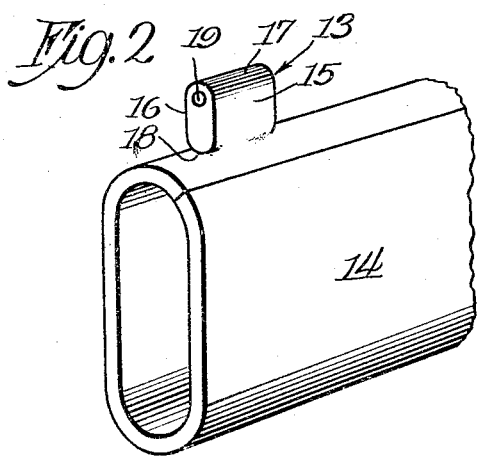
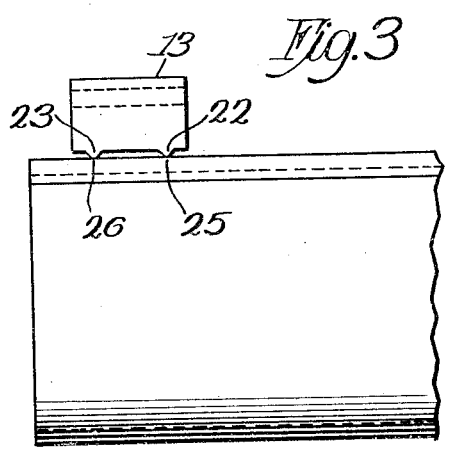
Inventor
James C. Dawson
By Gillson, Mann & Gitys.

Patented Jan. 17, 1933

1,894,736

UNITED STATES PATENT OFFICE

JAMES C. DAWSON, OF WEBSTER GROVES, MISSOURI, ASSIGNOR TO ELMA N. DAWSON, OF WEBSTER GROVES, MISSOURI

LOOSE LEAF BINDER BAR

Application filed October 6, 1930. Serial No. 486,526.

This invention relates to loose leaf binders and has for its principal objects to provide improved hinge lugs, and facilitate securing the lugs to the binder tubes and render the joint between them more certain in production and more durable in use.

These and other objects and advantages will become apparent as the disclosure proceeds and the description is read in conjunction with the accompanying drawing, in which Fig. 1 represents a loose-leaf binder showing cover, binder-bar, hinge and hinge lugs;

Fig. 2 shows a portion of the binder tube with the hinge lug attached; and

Fig. 3 shows a portion of the tube in elevation with the hinge lug held in position for subsequent welding.

The flattened tubular form of the usual binder bar produces a very rigid bar which has at the same time little weight and since for several reasons, it is desirable to keep the weight low, the metal usually is quite thin. The cover of a ledger or book of the same class which is constantly handled must be thick and heavy to give proper protection to the bound sheets. Accordingly, the hinge lugs must be rugged, fairly large, and rigidly attached to the tube.

About the most rapid and easy way of affixing the lugs to the binder tube is by pressure electric welding, but since the metal of the lug is necessarily quite thick, and that of the tube quite thin, many difficulties arise. Usually, it will be found that before the lug reaches a welding temperature, the tube is far too hot, and is either badly burnt or bent and slumps as the welding pressure is applied.

One method of obviating this is to slide the bar over a mandrel. This is a slow operation and frequently after welding, the bar sticks on the mandrel.

I have obviated the foregoing difficulties by providing a ridge or point upon the lug. The section of metal in the ridge approximates the section of metal in the bar; the two pieces heat at a uniform rate, and, consequently, can be welded easily.

With particular reference to the figures, in Fig. 1, a loose leaf binder is generally indicated at 10, which is provided with a cover 11 having a tubular hinge 12 engaging the hinge lugs 13 and 13 which are welded onto the binder tube 14.

The hinge lug is preferably in the form of an oval block, its longer sides 15, 16, being flattened, and its edges 17, 18, being curved. One of the curved edges, 18, is provided with transverse V-shaped ridges, as 22, 23, which are seated on the tube 14 preliminary to the welding operation, as shown in Fig. 3.

I find it convenient to form the lugs in an automatic screw machine equipped with an eccentric collet; then as the stock revolves, the bore hole 19 (which gives clearance to the hinge pin 21) and the V's 22 and 23 extending across the opposite short curve are simultaneously formed.

In welding the lug to the tube to form a binder bar, the pieces are gripped in a proper fixture in the welding machine, and as the current flows, the ridges 22 and 23 heat at an equal rate with the metal under them. The final welding pressure drives the lug firmly against the tube along its entire length, but in a manner of speaking, the lug may be considered to be spot-welded only at the points 25 and 26.

It will be seen that the lugs are rigidly attached, and that the prior difficulties with burning and slumping are obviated by my device.

What I claim is:

1. A tubular binder bar having a relatively thin wall, and a hinge lug having a relatively thick wall welded to the wall of the binder bar.

2. A hinge lug for loose leaf binders comprising a flattened oval metallic section, a longitudinal bore in the body of the lug parallel to its major axis and located adjacent one of the curved edges, and a ridge-like projection extending from the normal surface of the other curved edge.

3. A binder bar for loose leaf binders comprising a binder tube and a hinge lug, said lug having small integral projections from its surface, which projections are welded to the tube.

In testimony whereof I affix my signature.

JAMES C. DAWSON.